United States Patent
Molugu et al.

(10) Patent No.: US 12,400,201 B2
(45) Date of Patent: Aug. 26, 2025

(54) SELF-SERVICE ITEM EXCEPTION PROCESSING

(71) Applicant: NCR Voyix Corporation, Atlanta, GA (US)

(72) Inventors: Aravind Kumar Molugu, Telangana (IN); Praneeth Kumar Gunda, Telangana (IN)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/498,863

(22) Filed: Oct. 12, 2021

(65) Prior Publication Data

US 2023/0116135 A1 Apr. 13, 2023

(51) Int. Cl.
*G06Q 20/18* (2012.01)

(52) U.S. Cl.
CPC .................... *G06Q 20/18* (2013.01)

(58) Field of Classification Search
CPC ........... G06Q 30/0238; G06Q 30/0268; G06Q 20/18; G06Q 30/0201; G06Q 20/401; G06Q 20/20; G06Q 30/02; G06Q 30/06; G06Q 10/087; G06Q 30/0209; G06Q 30/0256; G06Q 30/0273; G06Q 30/0276; G06Q 30/0633; G06Q 20/3221; G06Q 20/3272; G06Q 20/3274; G06Q 20/3276; G06Q 20/351; G06Q 20/36; G06Q 20/105; G06Q 20/227; G06Q 20/306; G06Q 20/321; G06Q 20/363; G07B 2017/00225; G07G 1/0009; G07G 1/0036; G07G 3/00; G06F 16/51; G06F 16/583; G06F 16/5854; G06F 16/5838; H04N 7/18; H04N 21/2343; H04N 21/234336; H04N 21/235; H04N 21/2356; H04N 21/238; H04N 21/2385; H04N 21/2402; H04N 21/2542; H04N 21/25825; H04N 21/25858; H04N 21/25875; H04N 21/25891; H04N 21/2668; H04N 21/4312; H04N 21/4314; H04N 21/4349; H04N 21/435; H04N 21/437; H04N 21/438; H04N 21/4622; H04N 21/643; H04N 21/64707; H04N 21/812; H04N 21/8126; H04N 21/84; H04N 21/8543; H04N 21/8545; H04N 7/15; H04N 7/165; H04N 7/17309;

(Continued)

(56) References Cited

U.S. PATENT DOCUMENTS 7,631,808 B2 * 12/2009 Kundu .................. G06V 20/41
235/383
10,043,168 B1 * 8/2018 Catoe .................... G06Q 20/18
(Continued)

FOREIGN PATENT DOCUMENTS

JP 5450528 B2 * 3/2014

*Primary Examiner* — Avia Salman
(74) *Attorney, Agent, or Firm* — Schwegman Lundberg & Woessner, P.A.

(57) ABSTRACT

An item exception is detected as being raised within a transaction workflow for a self-service transaction at a transaction terminal. Item descriptive information for an item that caused the item exception to be raised is obtained. When the workflow indicates that an attendant has logged into the terminal to address the item exception, the item descriptive information is rendered on a display of the terminal along with item exception details provided by the workflow.

16 Claims, 3 Drawing Sheets

(58) Field of Classification Search
CPC ... H04L 67/02; H04L 69/329; H04L 41/0213; H04L 41/145; H04L 41/50; H04L 43/00; H04L 43/0811; H04L 43/0817; H04L 43/0847; H04L 43/16; H04L 51/00; H04L 51/04; H04L 51/066; A47J 36/321; G06T 2201/005; G06T 2201/0051; G01F 9/003; G01G 11/02; G01G 11/04; G01G 11/06; G08B 13/1472; H05B 6/6464; H01L 27/1112; H01L 2224/7592; H01L 2224/7692; H01L 2224/7792; H01L 2224/7892; H01L 2224/7992

See application file for complete search history.

(56) References Cited

U.S. PATENT DOCUMENTS

| | | | | |
|---|---|---|---|---|
| 10,438,164 | B1* | 10/2019 | Xiong | G06F 18/25 |
| 2010/0318393 | A1* | 12/2010 | Acker | G06Q 10/0633 |
| | | | | 706/47 |
| 2014/0129362 | A1* | 5/2014 | Marquis | G07G 1/0036 |
| | | | | 705/23 |
| 2016/0342863 | A1* | 11/2016 | Kwon | G06V 10/454 |

* cited by examiner

SELF-SERVICE ITEM EXCEPTION PROCESSING

BACKGROUND

Retailers are embracing Self-Service Checkouts (SCOs) or Self-Service Terminals (SSTs) for a variety of reasons. Firstly, customers checking themselves out of stores allows the store to reduce cashier staff and instead use a single employee that can assist and watch a plurality of SCOs simultaneously. Secondly, the COVID19 pandemic have caused a staffing shortage, such that stores have no choice but to direct their customers to SCOs rather than cashier-assisted terminals (Point-Of-Sale (POS) terminals)) because the stores lack adequate staff to man the POS terminals.

Furthermore, demand for some items have skyrocketed as the economies around the world open back up for business post pandemic. The increased demand has caused inventory supply chains to be stressed and has caused consumers to panic resulting in consumers hording some products and further exacerbating demand. These problems require increased staffing to handle the customer traffic associated with the increased demand at a time when the labor market is already tight. Consequently, retailers have had to increase salaries and enhance fringe benefits to attract workers and their costs have increased. The retailers are forced to pass this cost along to their consumers by way of higher prices resulting in inflation. The retailers can reduce headcount to handle the increased demand through increased utilization of SCOs. Thus, self-checkouts have become a necessity for retailers.

However, there are a variety of concerns associated with self-checkouts such as consumer fraud, item identification errors on the SCOs, and governmental compliance on regulated items being sold. These types of situations often require an attendant who oversees the SCOs to have to manually intervene during the checkouts before the transactions are permitted to conclude. For example, alcohol requires intervention for the attendant to check a birthdate of a customer, an expensive item or an item frequently stolen may require an attendant to intervene and inspect the item, an item may be missing a barcode such that is not recognized by the SCO, an item may have an incorrect barcode, and other situations that require an attendant to manually visit, inspect, confirm, and/or override the exception item before the transaction is permitted to close.

When the attendant is called to a SCO for an item exception, this takes time because existing exception processes do not include any information on the SCO for the attendant to know which item caused the exception. As a result, the attendant has to ask the customer to identify the item or items, which results in the transaction taking longer than it should such that the customer becomes frustrated; customers waiting in a line to use the SCO become frustrated; and the attendant is occupied longer than should be necessary such that the attendant cannot assist other customers with item exceptions and cannot focus on other transactions that are identified as security concerns.

Thus, there is a need for more informative item exception information to be provided on SCOs during self-service transactions to improve transaction throughput and better manage customer self-service checkouts.

SUMMARY

In various embodiments, a system and methods for self-service item exception processing are provided.

According to an embodiment, a method for self-service item exception processing is presented. An item exception raised in a transaction workflow is detected during a self-service transaction at a Self-Service Terminal (SST). Item descriptive information is obtained for an item associated with the item exception raised. The item descriptive information is rendered on a display of the SST when the transaction workflow indicates an attendant has logged into the SST for an action of the attendant to address the item exception.

DETAILED DESCRIPTION

Figure 1:
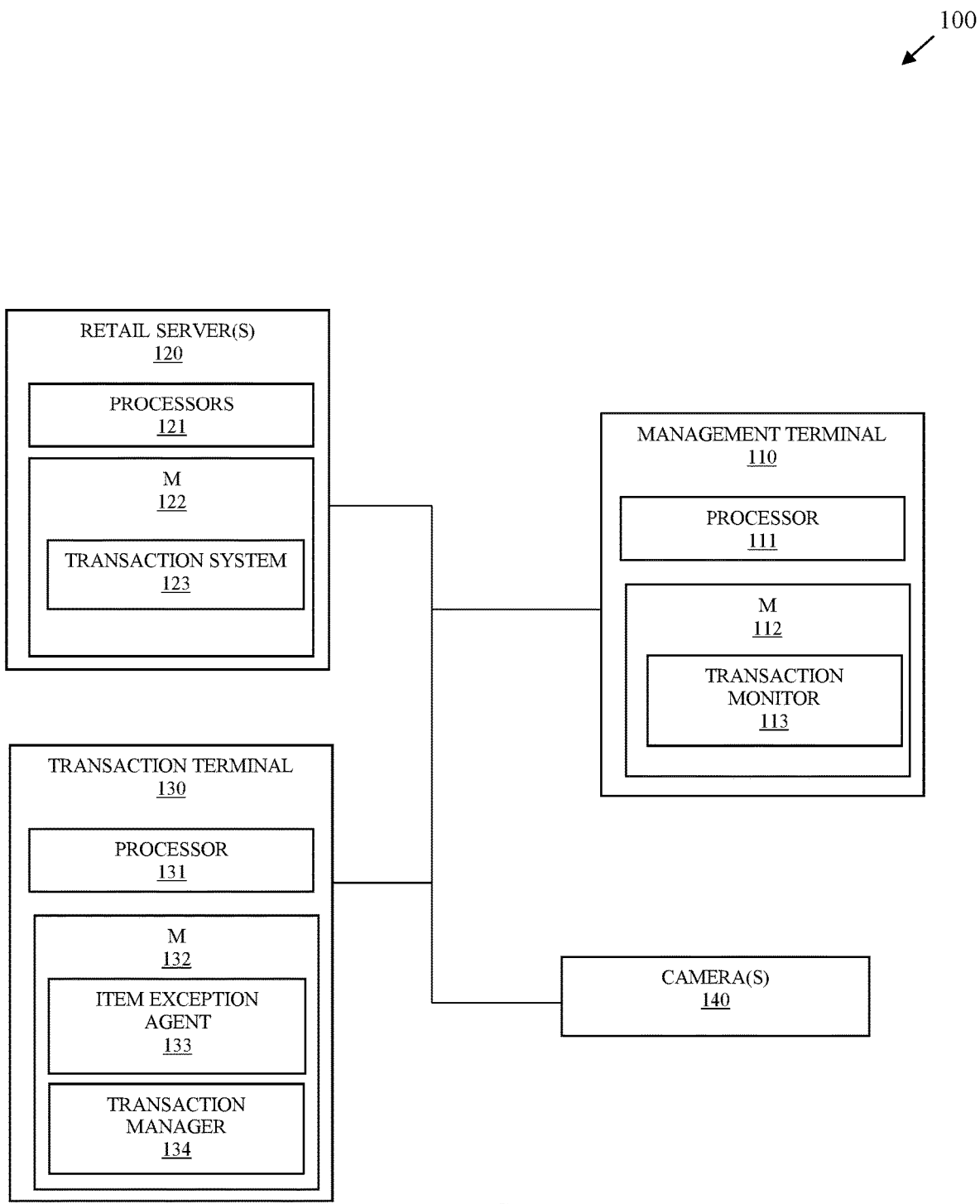
FIG. 1 is a diagram of a system for self-service item exception processing, according to an example embodiment.

FIG. 1 is a diagram of a system/platform 100 for self-service item exception processing, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of self-service item exception processing, presented herein and below.

System/platform 100 (herein after just "system 100") provides a processing environment by which item exceptions that cause a self-service transaction workflow to be interrupted for manual intervention of an attendant are enhanced to include descriptive details or information on an SST for the items that cause the exceptions. Existing self-service transaction workflows do present on the display what action an attendant needs to do for purposes of clearing the item exception; however, they do not provide any information about which item of the transaction items require the action by the attendant. Thus, the attendant needs to get that information from the customer and/or may need to inspect all the transaction items to identify the item associated with the exception. System 100 enhances the self-service transaction workflow when processing item exception to include descriptive information presented on the transaction display to the attendant with the attendant actions required.

As used herein, the terms "customer," "consumer," and/or "user" may be used interchangeably and synonymously herein and below. This refers to an individual that has is performing a self-service checkout transaction at an SST.

As used herein the terms "attendant," "clerk," and/or "staff member" may be used interchangeably and synonymously herein and below. This refers to an individual that is managing and overseeing a plurality of self-service checkout transactions occurring on a plurality of SSTs and the individual responsible for resolving item exceptions so that the transactions can conclude.

An "item exception" refers to a condition or an event that is raised within a self-service transaction workflow that requires an attendant to visit the terminal and perform an action on the item that raised the event. Item exceptions can occur on items whose item codes are known (such as alcohol, tobacco, etc.) and on items associated with security concerns of a retailer (expensive items or items known to be associated with fraud-items flagged by a retailer). Item exceptions may also occur on items whose item barcode are unknown such as items with a damaged barcode, items with missing barcodes, items with barcodes not recognized in a retailer's product catalogue, etc. Furthermore, item exceptions may be associated with items that are: not for sale, inactive, price not available in the product catalogue although the item code may be, item is time restricted (e.g., sales only after 12 noon on Sunday), item is age restricted, an item was recalled and cannot be sold, the quantity of the item is being restricted and the customer has too many (e.g., due to supply issues a customer may only be allowed to buy a single item), or the item is unknown not in the item product catalogue.

System 100 comprises a management terminal 110, one or more retail servers 120, a plurality of digital transaction terminals 130, and, optionally, one or more cameras 140.

Management terminal 110 comprises at least one processor 111 and a non-transitory computer-readable storage medium 112. Medium 112 comprises executable instructions for a transaction monitor 113. The executable instructions when provided to and executed by processor 111 from medium 112 cause processor 111 to perform the processing discussed herein and below for transaction monitor 113.

Each retail server 120 (hereinafter just "server 120") comprises at least one processor 121 and a non-transitory computer-readable storage medium 122. Medium 122 comprises executable instructions for a transaction system 123. The executable instructions when provided to and executed by processor 121 from medium 122 cause processor 121 to perform the processing discussed herein and below for transaction system 123.

Each transaction terminal 130 comprises at least one processor 131 and a non-transitory computer-readable storage medium 132. Medium 132 comprises executable instructions for an item exception agent 133 and a transaction manager 134. The executable instructions when provided to and executed by processor 131 from medium 132 cause processor 131 to perform the processing discussed herein and below for item exception manager 133 and transaction manager 134.

Camera(s) 140 (optional) capture transaction video of self-service transactions at the terminals 130. The video comprise images of the items being purchased at each terminal 130, which are time stamped and stamped with the terminal identifier for the terminal 140 to which the video corresponds. The video may be streamed into a network location accessible to transaction system 123, item exception agent 133, and/or item exception manager 113.

During a transaction workflow for a self-service transaction at a given terminal's transaction manager 134 raises an item exception for an item that interrupts the workflow and sends an attendant required message to transaction monitor 113 of management terminal 110 of the attendant and/or causes a lane or SCO light to be lit as a visible indication to the attendant that the corresponding terminal 130 requires the attendant to take some action for the transaction being processed on terminal 130.

Item exception agent 133 detects the raised event for the item exception that was raised by manager 134, when the item barcode was identified for the item (such as for time or age restricted item sales), the item code/identifier is obtained by agent 133. When the item barcode was not identified (missing, damaged, not available from item product catalogue), agent 133 correlates a portion of the video (image frames) associated with the item provided from any camera 140 to the event. Agent 133 may also correlate any item weight captured by a security weigh scale of terminal 130 to the event. Agent 133 may also correlate any features associated with an image captured by a scanner of terminal 130 with the event, such as color, size, shape, cropped off label portion of the image with the event when camera 140 is unavailable or in addition to any image frames already correlated with the event when camera 140 is available.

The item exception event and correlated information (item code when present, image frames, weight, features from scanner captured image) retained by agent 133 until an attendant log in is detected at terminal 130 indicating the attendant has come to terminal 130 to address the item exception during the workflow for the transaction so that the transaction manager 134 can complete processing of the workflow for the transaction.

When the attendant log in is detected by agent 133, the correlated information is rendered with the item exception actions already provided by the workflow on the display of terminal 130. So, when the item code was known, the item name and description available from the item catalogue from transaction system 123 is rendered for the attendant to see (for example, Budweiser® 12-pack, etc.). When the item code was known, known item information is obtainable using the item code. When the item code is unknown, the correlated item descriptive information is presented with the item exception actions such as features associated with the images, cropped images of the item, and/or any recorded item weight.

In an embodiment, item exception agent 133 may perform image analysis on any images or image frames associated with an exception item for purposes of extracting item features associated with edge detection, size, shape, label details for a label of the item, etc. The item features may be scored for purposes of identifying known candidate items, such as bananas, cereal, bottled water, etc. The identification can be coarse grain, such that the brand of the item does not require identification by agent 133. The item's coarse grain name associated with the item identification can be correlated with the item exception event and rendered with the item exception actions provided by transaction manager 134.

In an embodiment of the previous embodiment, agent 133 may uses a trained-machine learning algorithm that takes as input the image or image frames and produces as output the coarse grain item name or category.

In an embodiment, an existing workflow associated with transactions processed by an existing transaction manager does not require any source code modifications. Rather, agent 133 detects or monitors events raised by manager 134, identifies item exception events, identifies an attendant login event, and renders and additional screen on the display of terminal 130 for the correlated event information next to or adjacent to the existing item exception action produced by transaction manager 134. In this embodiment, agent 133 uses an Application Programming Interface (API) to interact with transaction system 123 to obtain item code lookup information for item exceptions that have the item code and to access image frames of any video or images captured by a scanner of terminal 130.

In an embodiment, agent 133 processes on server 120, such that agent 133 does not have to be resident on terminal 130 to perform the beneficial processing herein.

In an embodiment, agent 133 processes on a cloud server independent of server 120 and terminal 130. In this embodiment, agent 133 uses an API associated with one or more of transaction system 123 and transaction manager 134 to integrated with the transaction workflows of the transactions.

Figure 2:
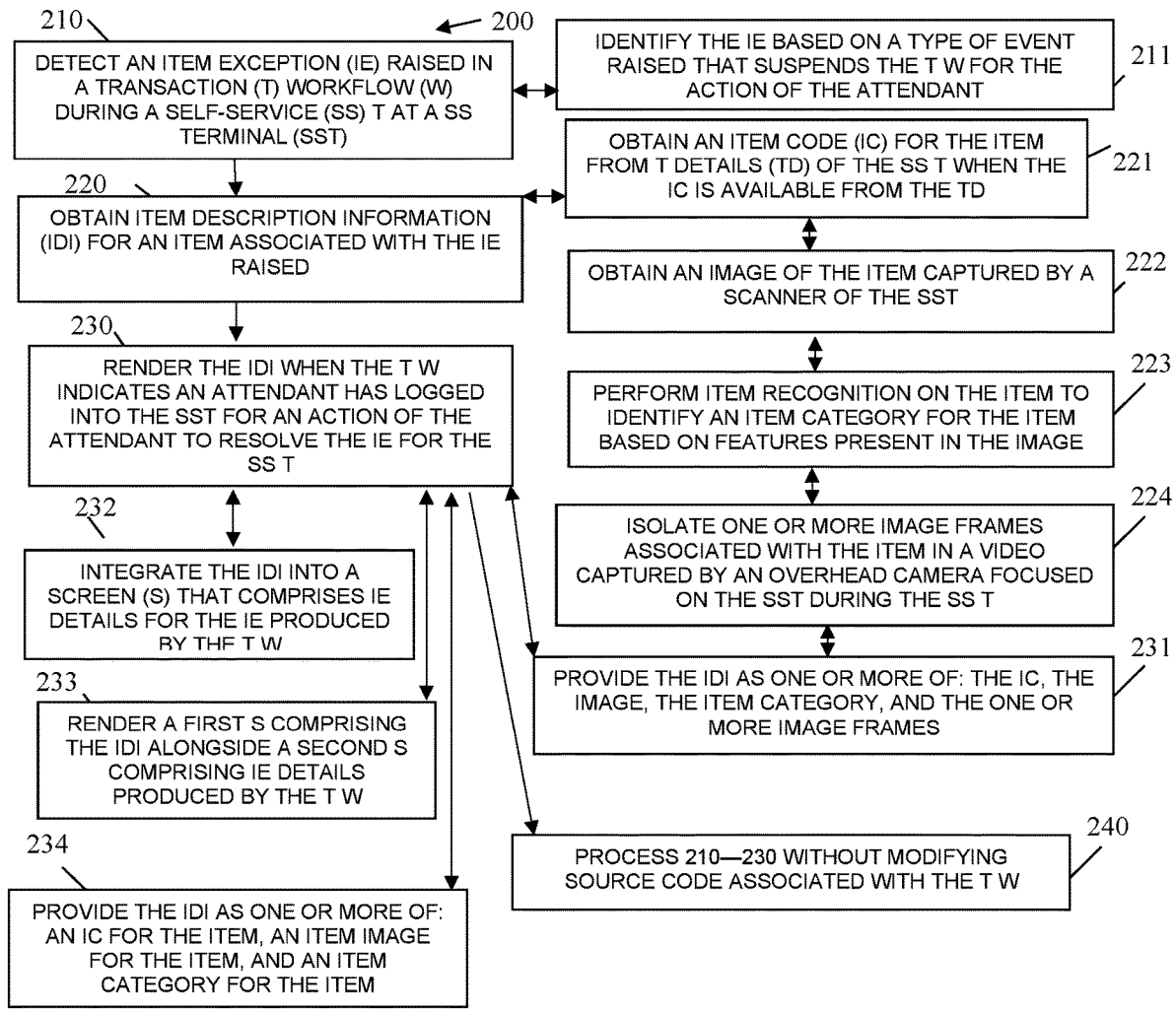
FIG. 2 is a diagram of a method for self-service item exception processing, according to an example embodiment.
Figure 3:
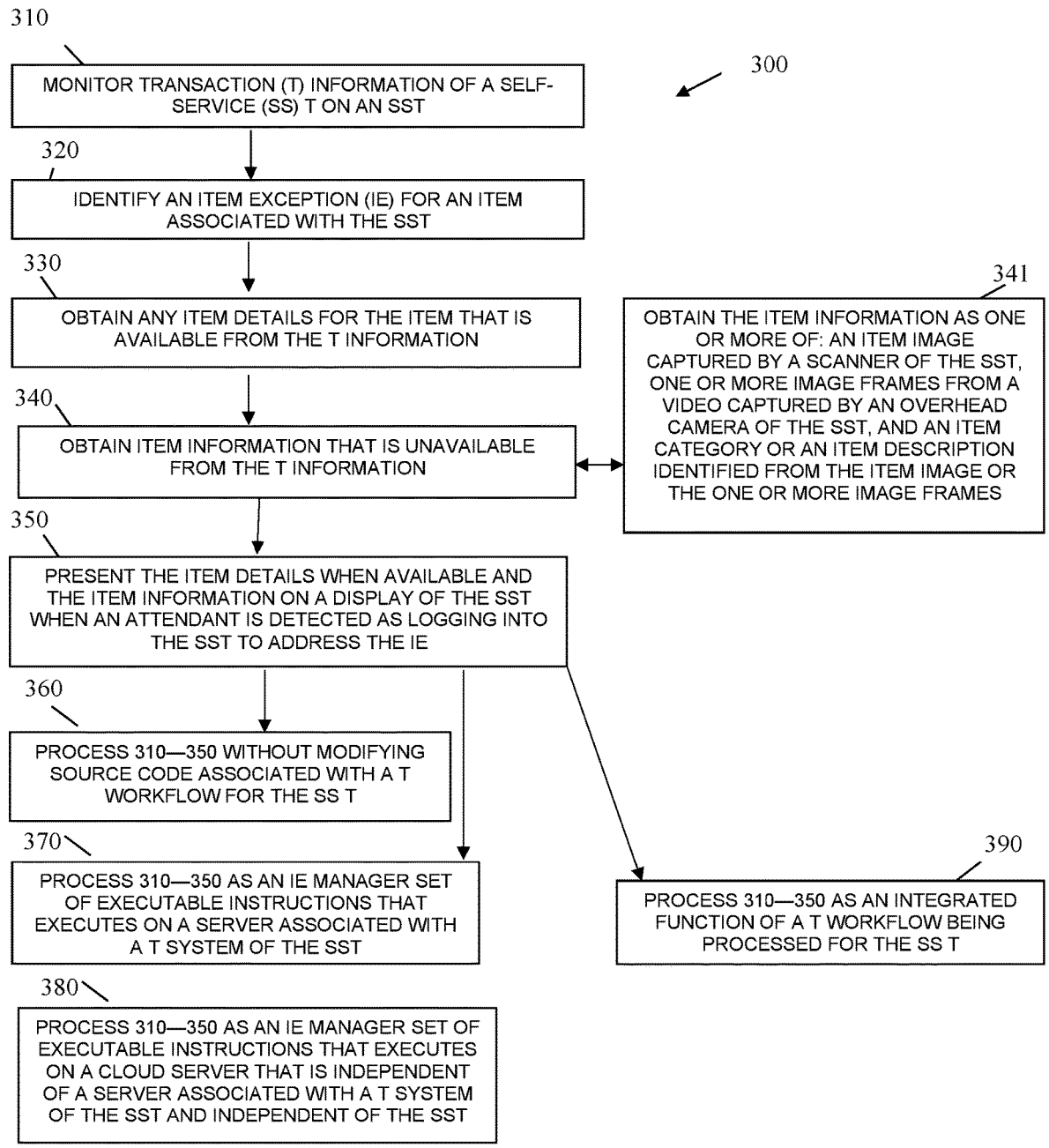
FIG. 3 is a diagram of another method for self-service item exception processing, according to an example embodiment.

The above-referenced embodiments and other embodiments are now discussed within FIGS. 2-3.

FIG. 2 is a diagram of a method 200 for self-service item exception processing, according to an example embodiment. The software module(s) that implements the method 200 is referred to as an "item exception manager." The item exception manager is implemented as executable instructions programmed and residing within memory and/or a non-transitory computer-readable (processor-readable) storage medium and executed by one or more processors of one or more devices. The processor(s) of the device that executes the item exception manager is specifically configured and programmed to process the item exception manager. The item exception manager may have access to one or more network connections during its processing. The network connections can be wired, wireless, or a combination of wired and wireless.

In an embodiment, the device that executes the item exception manager is terminal 130.

In an embodiment, the device that executes the item exception manager is server 120.

In an embodiment, the device that executes item exception manager is a cloud server that is independent of server 120.

In an embodiment, the item exception manager is all of or some combination of agent 133 and/or transaction manager 134.

At 210, the item exception manager detects an item exception raised in a transaction workflow during a self-service transaction at an SST.

In an embodiment, at 211, the item exception manager identifies the item exception based on a type of event raised that suspends the transaction workflow for the action of an attendant.

At 220, the item exception manager obtains item descriptive information for an item associated with the item exception raised.

In an embodiment, at 221, the item exception manager obtains an item code for the item from transaction details of the self-service transaction when the item code is available from the transaction details.

In an embodiment of 221 and at 222, the item exception manager obtains an image of the item captured by a scanner of the SST.

In an embodiment of 222 and at 223, the item exception manager performs item recognition on the item to identify an item category for the item based on features present in the image.

In an embodiment of 223 and at 224, the item exception manager isolates one or more image frames associated with the item in a video captured by an overhead camera focused on the SST during the self-service transaction.

At 230, the item exception manager renders the item description information when the transaction workflow indicates an attendant has logged into the SST for an action of the attendant to resolve the item exception for the self-service transaction.

In an embodiment of 224 and 230, at 231, the item exception manager provides the item description information as one or more of: the item code, the image, the item category, and the one or more image frames.

In an embodiment, at 232, the item exception manager integrates the item description information into a screen that comprises item exception details for the item exception that was produced by the transaction workflow.

In an embodiment, at 233, the item exception manager provides the item description information as one or more of: an item code for the item, an item image for the item, and an item category for the item.

In an embodiment, at 240, the item exception manager processes without modification to source code associated with the transaction workflow.

FIG. 3 is a diagram of another method 300 for self-service item exception processing, according to an example embodiment. The software module(s) that implements the method 300 is referred to as an "item exception agent." The item exception agent is implemented as executable instructions programmed and residing within memory and/or a non-transitory computer-readable (processor-readable) storage medium and executed by one or more processors of a device. The processors that execute the item exception agent are specifically configured and programmed for processing the item exception agent. The item exception agent may have access to one or more network connections during its processing. The network connections can be wired, wireless, or a combination of wired and wireless.

In an embodiment, the device that executes the item exception agent is terminal 130. In an embodiment, the terminal 130 is an SST or a SCO.

In an embodiment, the item exception agent is all of or some agent 133, transaction manager 134, and/or method 200 of FIG. 2.

The item exception agent presents another and, in some ways, enhanced processing perspective from that which was discussed above for terminal 130 and method 200.

At 310, the item exception agent monitors transaction information of a self-service transaction being processed on an SST.

At 320, the item exception agent identifies an item exception for an item associated with the SST.

At 330, the item exception agent obtains any item details for the item that is or that may be available from the transaction information.

At 340, the item exception agent obtains item information that is unavailable from the transaction information.

In an embodiment, at 341, the item exception agent obtains the item information as one or more of: an item image captured by a scanner of the SST, one or more image frames from a video captured by an overhead camera of the SST, and an item category or an item description identified from the item image or the one or more image frames.

At 350, the item exception agent presents the item details, when available, and the item information on a display of the SST when an attendant is detected as logging into the SST to address the item exception.

In an embodiment, at 360, the item exception agent processes without any modification to source code associated with a transaction workflow for the self-service transaction.

In an embodiment, at 370, the item exception agent processes as an item exception manager set of executable instructions that executes on a server associated with a transaction system of the SST.

In an embodiment, at 380, the item exception agent processes as an item manager set of executable instructions that executes on a cloud server that is independent of a server associated with a transaction system of the SST and independent of the SST.

In an embodiment, at 390, the item exception agent processes as an integrated function of a transaction workflow being processed on the SST for the self-service transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting an item exception raised in a transaction workflow during a self-service transaction at a self-service terminal (SST), wherein the item exception is one that requires intervention by an attendant before the transaction workflow can complete, wherein detecting further includes correlating, when an item barcode was not identified with the item exception, image frames associated with the item exception to a portion of a video captured for a transaction and an item weight captured by a weigh scale for an item during the transaction, wherein the portion of the video is time stamped and stamped with a transaction terminal identifier for the SST, wherein the intervention expects the attendant to manually visit the SST;
   obtaining item descriptive information for the item associated with the item exception raised, wherein the item descriptive information includes at least an item name and description available from an item catalogue;
   identifying the attendant as logging into the SST for an action to take in response to the item exception;
   in response to the identifying, rendering on a display of the SST the item descriptive information along with attendant actions required for resolving the item exception and providing with the item descriptive information the portion of the video on the SST, wherein rendering further includes presenting additional item information comprising coarse grain item name or category identified from image analysis performed on the image frames associated with the item exception; wherein the image analysis is performed by extracting item features associated with edge detection, size, shape, and label details for a label of the item, scoring the item features for purposes of identifying known candidate items, and using a trained-machine learning algorithm that takes as input the image frames and produces as output the coarse grain item name or category; and
   processing the method without modifying source code associated with the transaction workflow.

2. The method of claim 1, wherein detecting further includes identifying item exception based a type of event raised that suspends the transaction workflow for the action of the attendant.

3. The method of claim 2, wherein obtaining further includes obtaining an item code for the item from transaction details of the self-service transaction when the item code is available from the transaction details.

4. The method of claim 3, wherein obtaining further includes obtaining an image of the item captured by a scanner of the SST.

5. The method of claim 4, wherein obtaining further includes performing item recognition on the item to identify an item category for the item based on features present in the image.

6. The method of claim 5, wherein performing further includes isolate one or more of the image frames associated with the item in the video captured by an overhead camera focused on the SST during the self-service transaction.

7. The method of claim 6, rendering further includes providing the item descriptive information as one or more of: the item code, the image, the item category, and the image frames.

8. The method of claim 1, wherein rendering further includes integrating the item descriptive information into a screen that comprises item exception details for the item exception produced by the transaction workflow.

9. The method of claim 1, wherein rendering further includes rendering a first screen comprising the item descriptive information alongside a second screen comprising item exception details produced by the transaction workflow.

10. The method of claim 1, wherein rendering further includes providing the item descriptive information as one or more of:
    an item code for the item, an item image of the item, and an item category for the item.

11. A method, comprising:
    monitoring transaction information of a self-service transaction on a Self-Service Terminal (SST);
    identifying an item exception for an item associated with the self-service transaction, wherein the item exception requires intervention by an attendant before the self-service transaction can complete, wherein the intervention expects the attendant to manually visit the SST;
    obtaining any item details for the item that is available from the transaction information;
    obtaining item information that is unavailable from the transaction information and when an item barcode was not identified with the item exception, correlating image frames associated with the item exception to a portion of a video captured for a transaction and an item weight captured by a weigh scale for an item during the transaction, wherein the portion of the video is time stamped and stamped with a transaction terminal identifier for the SST, wherein unavailable item details includes at least an image of the item captured by a scanner of the SST, wherein when the item barcode is identified, the item information at least an item name, and description available from an item catalogue;

determining the attendant as logging into the SST to address the item exception;

in response to the determining, presenting the item details when available and additional item information on a display of the SST, wherein the additional item information includes a coarse grain item name or category identified from image analysis performed on the image frames associated with the item exception;

wherein the image analysis is performed by extracting item features associated with edge detection, size, shape, and label details for a label of the item, scoring the item features for purposes of identifying known candidate items, and using a trained-machine learning algorithm that takes as input the image frames and produces as output the coarse grain item name or category;

and processing the method without modifying source code associated with a transaction workflow for the self-service transaction.

12. The method of claim 11 further comprising, processing the method as an item exception agent set of executable instructions that executes on the SST.

13. The method of claim 11 further comprising, processing the method as an item exception manager set of executable instructions that executes on a server associated with a transaction system of the SST.

14. The method of claim 11 further comprising, processing the method as an item exception manager set of executable instructions that executes on a cloud server that is independent of a server associated with a transaction system of the SST and that is independent of the SST.

15. A system, comprising:

a Self-Service Terminal (SST) comprising a processor and a non-transitory computer-readable storage medium;

the non-transitory computer-readable storage medium comprises executable instructions; and the executable instructions when executed on the processor from the non-transitory computer-readable storage medium cause the processor to perform operations comprising:

detecting an item exception raised for an item during a self-service transaction on the SST, wherein the item exception requires intervention by an attendant before the self-service transaction can complete, wherein the intervention expects the attendant to manually visit the SST;

assembling item information for the item from transaction details associated with the self-service transaction and from images captured of the item during the self-service transaction and when an item barcode was not identified with the item exception, correlating the images associated with the item exception to a portion of a video captured for a transaction and an item weight captured by a weigh scale for an item during the transaction, wherein the portion of the video is time stamped and stamped with a transaction terminal identifier for the SST, wherein when the item barcode is identified, the item information includes at least an item name and description available from an item catalogue;

identifying the attendant as logging into the SST;

in response to the identifying, rendering the item information within a screen on a display of the SST, wherein rendering further includes presenting additional item information comprising a coarse grain item name or category identified from image analysis performed on the images associated with the item exception;

wherein the image analysis is performed by extracting item features associated with edge detection, size, shape, and label details for a label of the item, scoring the item features for purposes of identifying known candidate items, and using a trained-machine learning algorithm that takes as input the images and produces as output the coarse grain item name or category;

and processing the executable instructions without modifying source code associated with a transaction workflow for the self-service transaction.

16. The system of claim 15, wherein the executable instructions associated with the assembling further include additional executable instruction that further cause the processor to perform additional operations comprising:

performing item recognition on at least one of the images to identify an item category for the item by extracting features from the at least one image, scoring the features, and matching a score for the at least one image to a model score associated with the item category.

\* \* \* \* \*